(12) United States Patent
Badding et al.

(10) Patent No.: US 6,551,735 B2
(45) Date of Patent: Apr. 22, 2003

(54) HONEYCOMB ELECTRODE FUEL CELLS

(75) Inventors: Michael E. Badding, Elmira, NY (US); John F. Wight, Jr., Corning, NY (US)

(73) Assignee: Corning Incorporated, Corning, NY (US)

(*) Notice: Subject to any disclaimer, the term of this patent is extended or adjusted under 35 U.S.C. 154(b) by 34 days.

(21) Appl. No.: 09/736,742

(22) Filed: Dec. 14, 2000

(65) Prior Publication Data

US 2002/0076595 A1 Jun. 20, 2002

Related U.S. Application Data

(60) Provisional application No. 60/173,399, filed on Dec. 28, 1999.

(51) Int. Cl.[7] .............................. H01M 8/12; H01M 8/24
(52) U.S. Cl. ............................. 429/31; 429/32; 429/40; 427/115
(58) Field of Search ............................ 429/31, 32, 40; 427/115; H01M 8/12

(56) References Cited

U.S. PATENT DOCUMENTS

| 4,476,198 A | 10/1984 | Ackerman et al. ............. 429/32 |
| 4,666,798 A | 5/1987 | Herceg ......................... 429/12 |
| 4,883,497 A | 11/1989 | Claar et al. ............... 429/33 X |
| 5,009,763 A * | 4/1991 | Hise ......................... 429/31 X |
| 5,213,910 A * | 5/1993 | Yamada ........................ 429/32 |
| 5,273,837 A | 12/1993 | Aitken et al. ................. 429/30 |
| 6,025,084 A | 2/2000 | Kawasaki et al. ............. 429/30 |
| 6,361,893 B1 * | 3/2002 | George et al. ................ 429/31 |
| 6,372,375 B1 * | 4/2002 | Lawless ........................ 429/40 |

FOREIGN PATENT DOCUMENTS

EP 503526 * 9/1992 ............ H01M/8/24

* cited by examiner

Primary Examiner—Stephen Kalafut
(74) Attorney, Agent, or Firm—Kees van der Sterre

(57) ABSTRACT

Solid oxide fuel cells (SOFC) based on mechanically durable honeycomb electrodes supporting thin electrolyte and counter electrode layers in selected honeycomb channels provide dependable operation and high volume power density through extended use cycles.

8 Claims, 7 Drawing Sheets

HONEYCOMB ELECTRODE FUEL CELLS

This application claims the benefit of U.S. Provisional Application No. 60/173,399, filed Dec. 28, 1999, entitled "Honeycomb Electrode Fuel Cells", by Badding et al.

BACKGROUND OF THE INVENTION

The concept of using monolithic honeycomb structures to provide solid oxide fuel cells (SOFC) is well known. U.S. Pat. Nos. 4,476,198 and 4,666,798, for example, describe fuel cell assemblies built up in complex fashion from honeycomb cell segments incorporating contacting electrolyte, anode, cathode, and interconnect layers that cooperate to impart the necessary strength and structural integrity to the completed cell. Alternate channels of the honeycomb monolith are fed with fuel and oxidant (e.g., air) respectively—yielding a large current-generating active area. Anticipated advantages of honeycomb configurations include an increase in volume power density (power per unit of fuel cell volume).

Common features of many of these prior art fuel cell designs are cell segments based on an interconnecting honeycomb or sheet framework of electrolyte material onto or within which the electrodes are subsequently deposited or attached. One difficulty with this approach is that neither the electrolyte framework nor the attached electrodes alone impart any real structural strength to the cell assembly. At most these structures have been self-supporting, and relatively susceptible to mechanical damage from even the thermal stresses regularly encountered in use.

Because good SOFC performance requires low electrolyte resistance, especially at lower temperatures (below 800° C.) where low cost metallic components may be employed, the use of thicker stronger electrolyte honeycomb structural members is not a viable remedy. In the case of yttria-stabilized zirconia, for example, which is a favored SOFC electrolyte, an electrolyte layer thickness of less than about 50 microns will probably be needed for acceptable fuel cell performance. The fabrication of honeycombs having defect-free walls of such thickness, especially by means of economic forming processes such as direct honeycomb extrusion, is not presently feasible. Hence alternative honeycomb fuel cell designs, especially if enabled by inexpensive forming processes not requiring the direct formation of thin-walled electrolyte structures, would be desirable.

SUMMARY OF THE INVENTION

In accordance with the invention a solid oxide fuel cell design based on a fuel cell electrode of honeycomb structure is provided. The honeycomb electrode, which may be the anode or the cathode of the fuel cell, incorporates gas-permeable interconnecting walls forming parallel channels extending from one face to the other of the honeycomb. The channels are open-ended to allow for the free flow of fuel or oxidant gases therethrough.

The electrolytes and counter-electrodes in these fuel cell designs are provided as coatings within selected, e.g., alternate, channels of the honeycomb structure. That is, plural electrolyte layers are provided on the walls of selected channels within the honeycomb, and counter-electrode layers are deposited on top of those electrolyte layers to form the electrode/electrolyte/counter-electrode structure required for fuel cell operation.

When the honeycomb electrode is to function as the anode or fuel side of the fuel cell, those honeycomb channels selected to carry the oxidant for the cell will be provided with electrolyte and cathode layers, while the alternate or anode channels will be left uncoated. As in conventional honeycomb fuel cell designs, the cathode or oxidant channels will share gas-permeable channel walls with the anode or fuel channels to allow the fuel-oxidant reactions to occur at the electrolyte.

Honeycomb electrode fuel cells provided in accordance with the invention offer significant electrical and mechanical advantages over conventional fuel cells of honeycomb structure. The gas-permeable honeycomb electrodes can be as heavy as needed to provide the required mechanical durability for the cell without compromising electrical performance. The use of a ductile metal or metallic honeycomb electrode structure substantially improves the thermal shock tolerance of the structure, and the use of extrusion processes to form the honeycomb electrodes, whether of metallic or ceramic structure, provides a significant cost advantage. Finally the significant electrochemical performance advantages of extremely thin electrolyte layers can be fully realized since the electrolytes are not required to provide any structural support whatever to the fuel cell assembly.

DESCRIPTION OF THE DRAWINGS

The invention is further illustrated in the appended drawings, wherein like parts are identified by like numbers.

DETAILED DESCRIPTION

The "building block" of the SOFC design of the invention is a porous honeycomb electrode structure, typically a section or slice of an extruded honeycomb shape, which is the substrate upon which the SOFC is built. A plurality of channels within the honeycomb are coated with active materials with an adjacent set of channels left empty. If the substrate is an anode material, air is directed to the coated channels while the empty channels provide for fuel access. If the substrate is a cathode material, fuel is directed into the coated channels while empty channels provide for air access. Within the active material channels, a fuel cell comprising an anode, cathode and electrolyte is formed. The structure of the fuel cell depends upon the material comprising the honeycomb structure.

Figure 1:
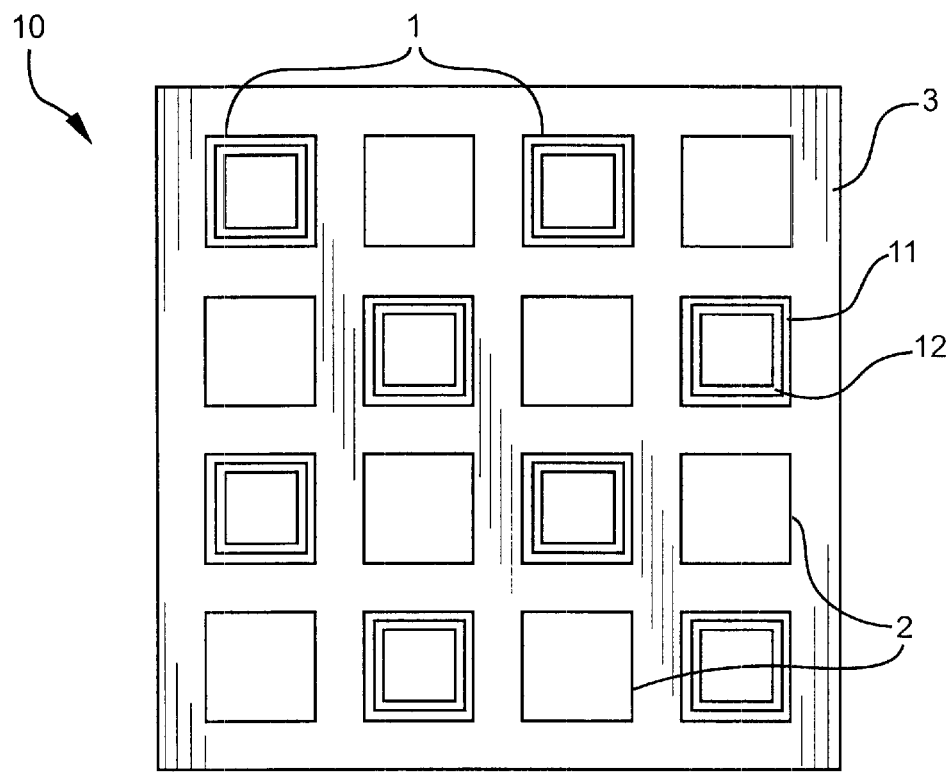
FIGS. 1–1a present schematic top plan and perspective views of a honeycomb electrode supporting electrolyte and counter-electrode coatings within the honeycomb channels.
Figure 1A:
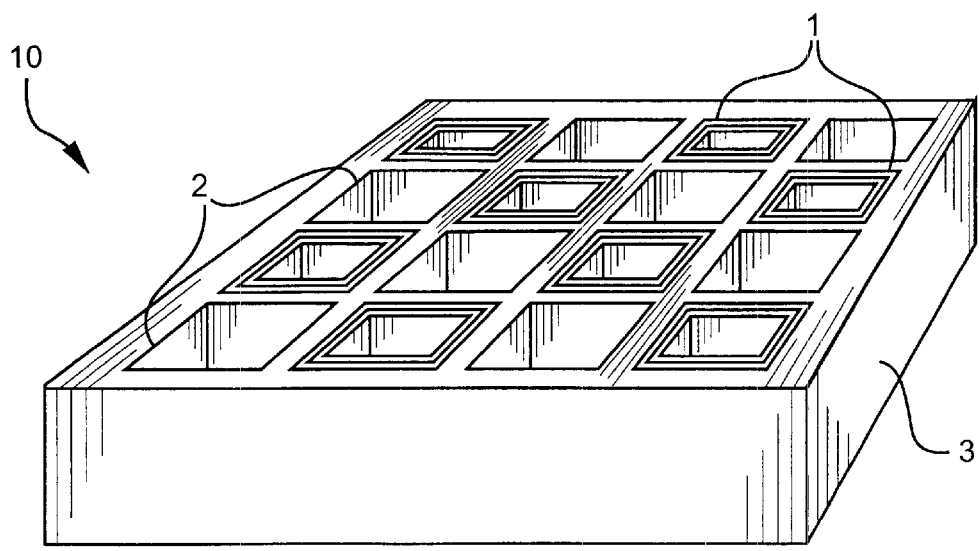

FIGS. 1–1a of the drawings provide a schematic illustration of a fuel cell design wherein the supporting honeycomb electrode is an anode. Referring to those figures, a fuel cell element 10 incorporates a gas-permeable supporting honeycomb structure 3 formed of an anodic material such as porous metallic nickel. In the fuel cell of FIGS. 1–1a, alternating cells 1 of the anode support are provided with a dense, non-porous ceramic electrolyte layer 11 formed, for example of yttria-stabilized zirconia, while in alternating cells 2 the anode surfaces are left uncoated. Over electrolyte layer 11 in coated cells 1 is provided a cathode layer 12. This layer is typically formed of a catalytically active, electronically conductive material that promotes oxygen dissociation at the electrolyte while at the same time providing the electronic conductivity required for cell function.

Optional additional layers can be included within the structure to optimize electrical performance. These include catalytically active layers disposed on the electrode, or on or between the electrolyte and counter-electrode layers, for purposes such as activating fuel species or the like. For example, as is well-known in the art, a nickel-zirconia cermet layer may be deposited on a substantially porous nickel honeycomb to lower the anode interface resistance. Other optional layers include current distribution layers or elements positioned against electrode or counter-electrode surfaces to reduce the resistance of the cell to electron flow.

Examples of suitable cathode materials effective to improve oxidation efficiency within the cell are lanthanum strontium manganite, lanthanum strontium chromite, and certain silver alloys. Examples of suitable current distribution elements include silver, silver alloys, and high-temperature-stable base metal alloys such as Y2O3-Fe—Cr—Ni. Such current distribution elements for these cells may be provided as overlayers or separate structures such as inserted metal felts, or even provided in intimate admixture with selected cathode materials.

As previously suggested, a particular advantage of a fuel cell of the design above described is that the dense ceramic electrolyte layers deposited within the channels of the honeycomb do not need to contribute to the structural strength of the cell. Therefore, the electrolyte layers grown or otherwise deposited within the honeycomb channels may have only such thickness as is required to provide the required electrical and chemical isolation between electrodes. Electrolyte layers of thin cross-section (e.g., less than about 50 microns in thickness) should be used if cells of high electrical power density (e.g., power densities in excess of 0.25 watts/cm2) are to be provided.

In honeycomb fuel cell designs such as hereinabove described, current flow parallel to the direction of channel flow is required. The length of the honeycomb channels, or the width of a honeycomb slice taken transverse the axes of the channels, then determines the current path length for each fuel cell element so constructed. In effect, for any specified cell internal resistance, the honeycomb slice width for the cell will be limited by the conductivity of the current distribution elements.

In the case of an anode-supported honeycomb structure, the use of a relatively highly conductive nickel honeycomb composition provides acceptable electronic conductivity for the cell at relatively high slice widths, if honeycomb wall thicknesses on the order of 100 micrometers or more are provided. Current distribution on the cathode side is somewhat more difficult due to the lower electronic conductivity of currently available cathode materials. However, the use of silver or silver alloy current distribution layers of only a few microns thickness covering the cathode layers allows current paths (slice widths) of a centimeter or more to be employed with resistive losses that are acceptable for economic cell performance.

As is apparent from the above description, the active elements within any one honeycomb cell provided as described are in electrical parallel, since they share a common anode. Voltage building in stacks of these fuel cells is thus best accomplished by interconnecting the cathode channels or elements of one honeycomb structure to anode channels or elements of its adjacent honeycomb structure.

Figure 2:
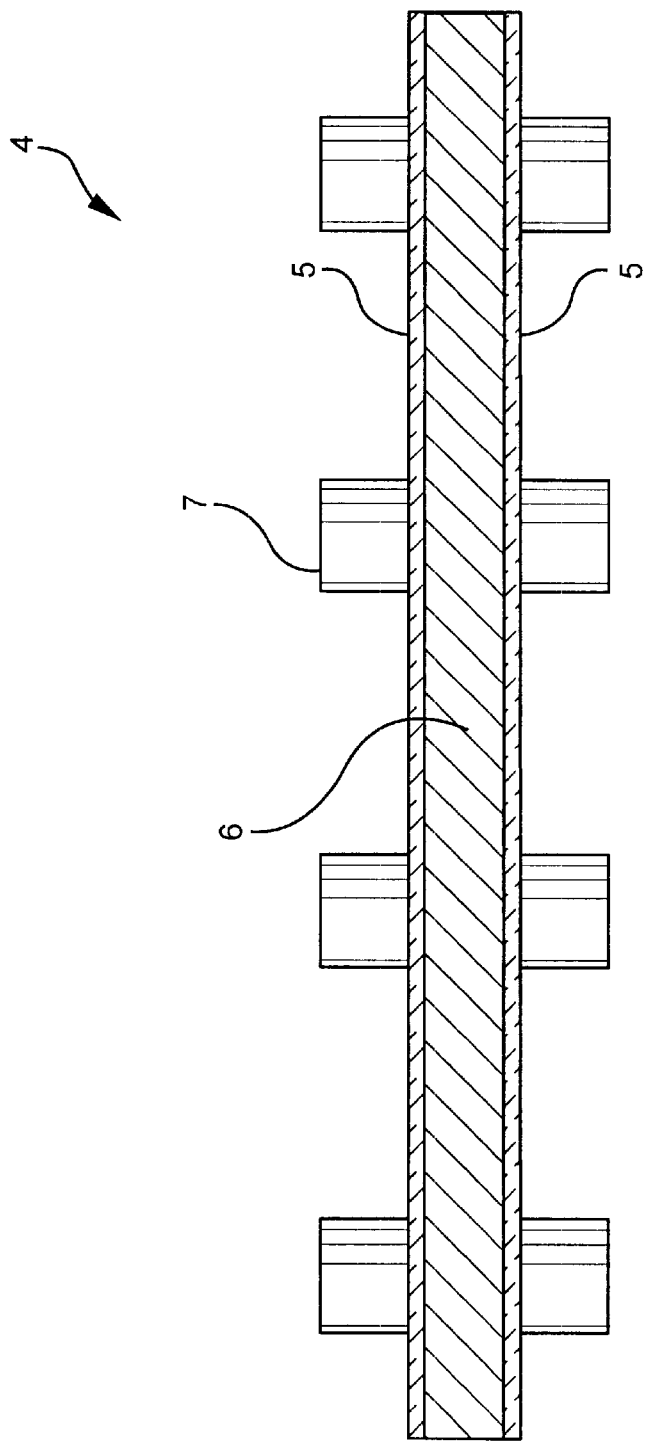
FIG. 2 is an exploded perspective view of a fuel cell assembly incorporating honeycomb electrode and manifolding components.
Figure 2A:
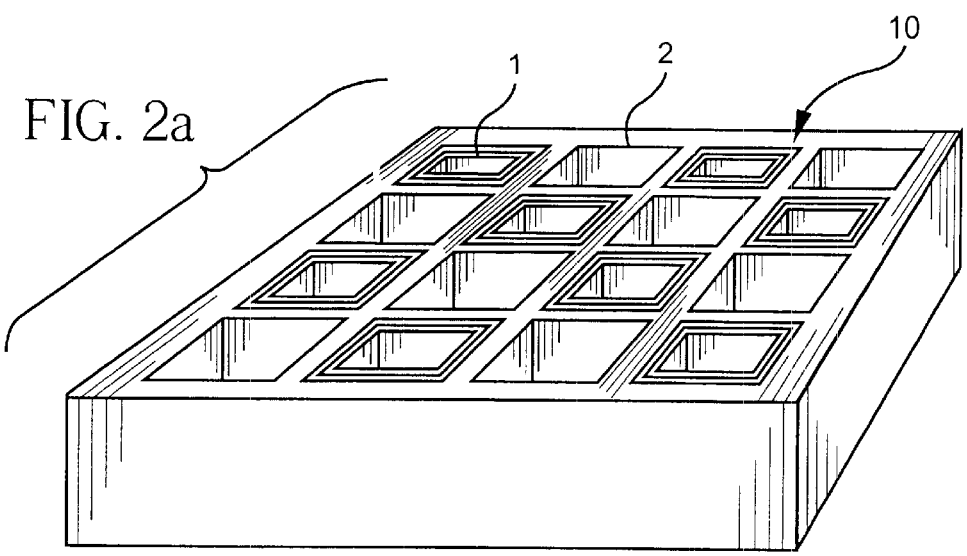
Figure 2A:
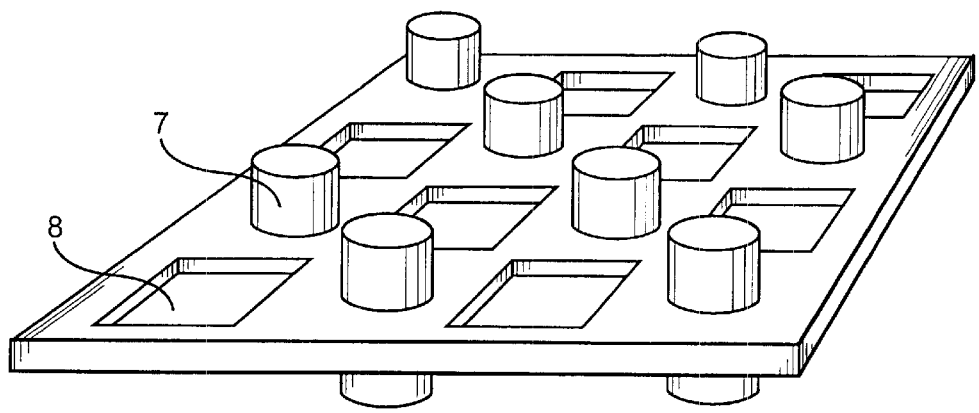
Figure 2A:
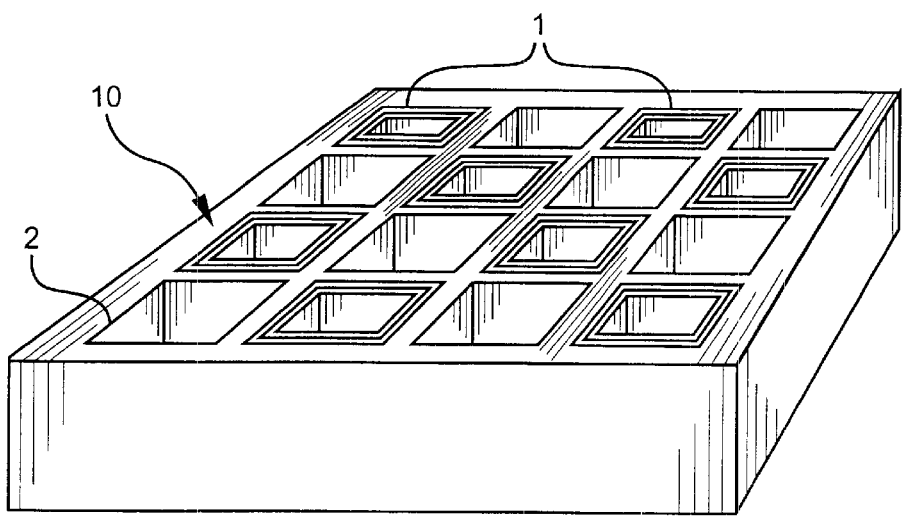
Figure 3:
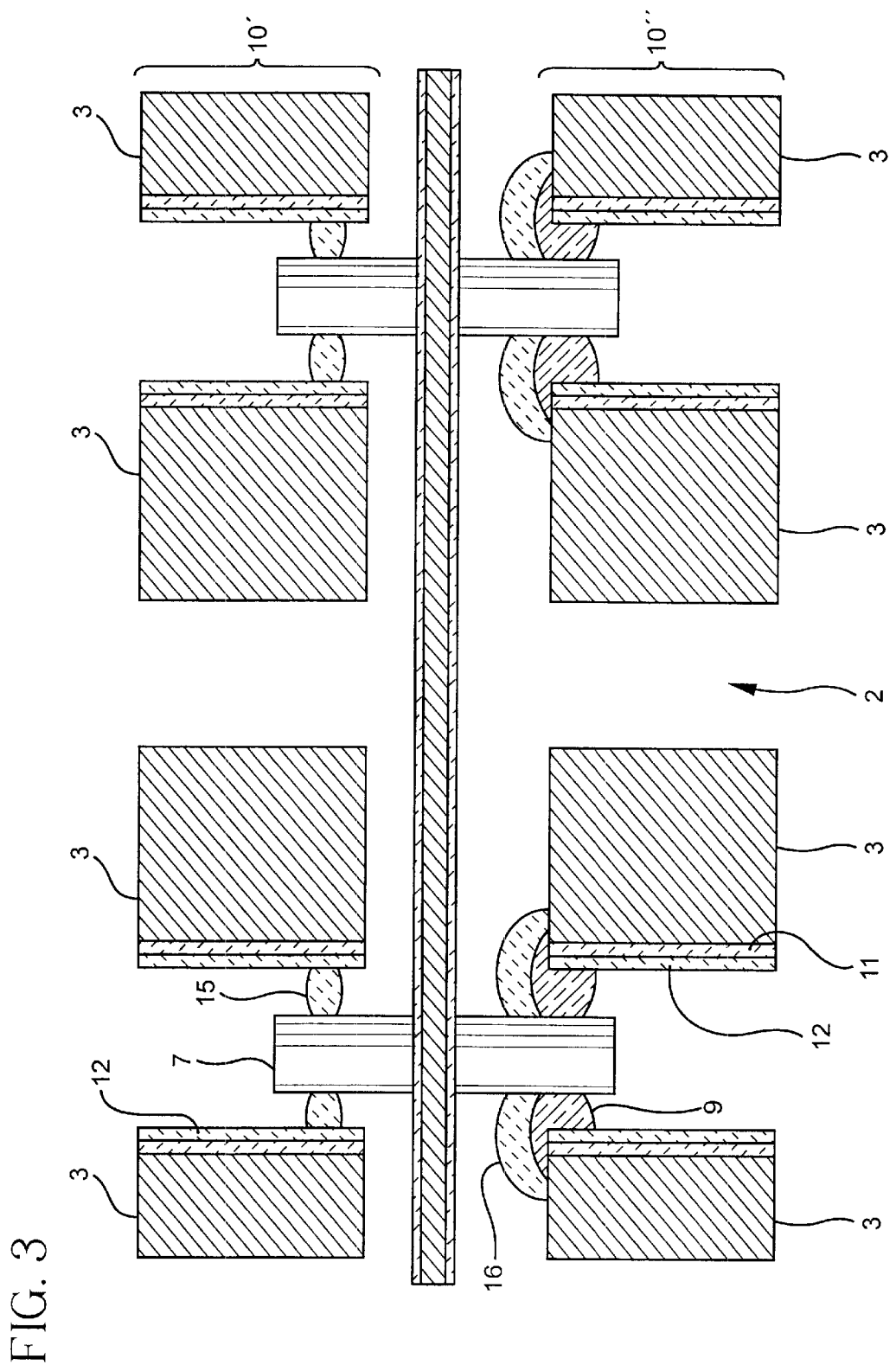
FIG. 3 provides a schematic cross-sectional view of an electrical series connection between adjacent honeycomb electrode fuel cell components.

FIGS. 2 and 3 of the drawings illustrate one method for increasing voltage output using a simple stacking arrangement. FIG. 2 of the drawings is an exploded view of a portion of a fuel cell stack wherein two honeycomb fuel cell elements 10 are to be connected by a plural air tube structure 4 incorporating a tube array of hollow tubes 7 for interconnecting the cathode (air or oxidant) channels 1 of adjacent honeycomb elements 10. The tubes are made of a high-temperature-stable conductive material such as an oxidation-resistant metal, and are sized for insertion into the cathode channels of the two elements to be connected. Thus the tubes provide for both oxidant distribution and electrical interconnection within the cell. At the same time, alternate openings 8 within tube structure 4 provide paths for fuel distribution within the stack.

As shown in more detail in the partial cross-sectional view of FIG. 2, air tube structure 4 includes a conductive base plate 6 to which conductive tubes 7 are sealed. Disposed on conductive base plate 6 are opposing insulating coatings 5 designed to prevent short circuiting of the cells which would result from conductive bridging of adjacent anode and cathode channels by the conductive base plate.

A suitable method for providing voltage-building anode-to-cathode electrical interconnections within stacks incorporating air tube structures of the type shown in FIG. 2 is illustrated in FIG. 3. In that illustration, insulating elements 9 prevent electrical contact between the lower end of each conductive tube 7 and cathode layer 12 in lower honeycomb element 10", while at the upper end of tube 7, conductive sealing material 15 provides electrical contact and a gas seal between the tube and cathode layer 12 of upper honeycomb element 10'.

Electrical interconnection between the bottom end of tube 7 and the anode of lower honeycomb element 10" is provided by conductive sealing material 16 which also provides a gas seal preventing any leakage of air or other oxidant from channel 1 during cell operation. The desired cathode-to-anode connection is thus made by seal 16 through tube 7 and seal 15.

Sealing and electrical contact with the anode or fuel side of the cell is relatively straightforward since the atmosphere at the contact is a reducing (fuel) atmosphere. However, contact at the cathode requires a conductive material that is also stable in a high-temperature oxidizing environment. Silver and silver alloys are examples of materials that can provide the required stability.

Figure 4:
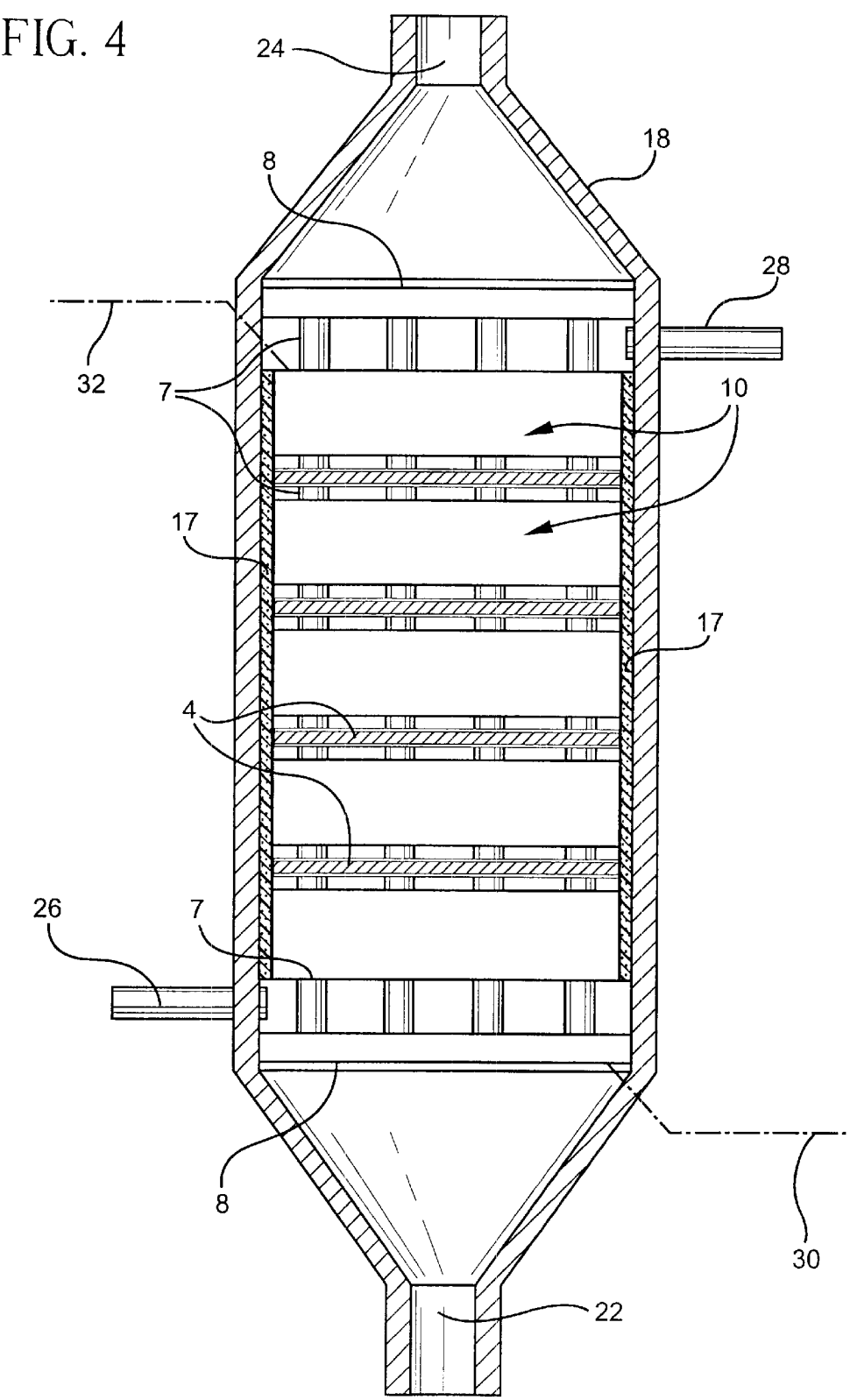
FIG. 4 presents elevational and top plan cross-sectional views of a fuel cell incorporating honeycomb electrodes.
Figure 4A:
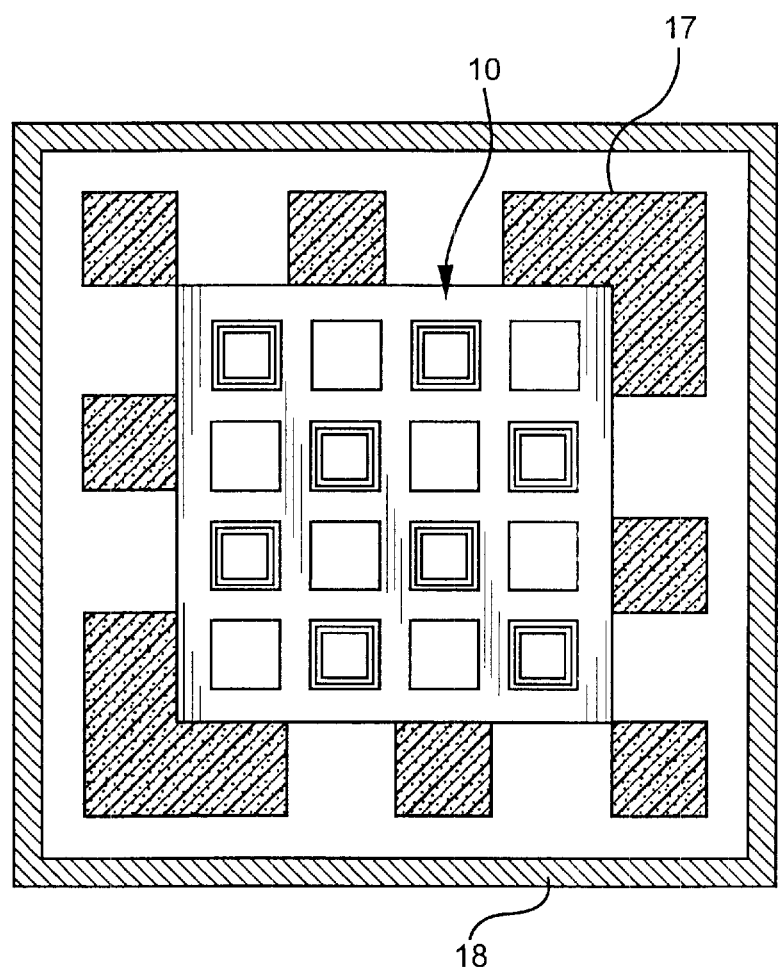

FIG. 4 of the drawing provides schematic elevational and plan views of an arrangement for a fuel cell stack incorporating a plurality of honeycomb cells interconnected in series as shown in FIG. 3. Multiple honeycomb elements 10 are mounted within gas-tight enclosure 18 through which air is passed via air inlet 22 and air outlet 24. Fuel is delivered to the cell array through fuel inlet 26, and is exhausted via fuel outlet 28. Cell elements 10 are separated from the wall of enclosure 18 by spacers 17 which electrically isolate the cells from the wall but allow fuel circulation to exterior anode surfaces of cells 10.

The honeycomb cells within enclosure 18 are physically separated from each other by air tube structures 4 but electrically interconnected as in FIG. 3. Electrical power is drawn from the stack through positive electrical lead 30 and negative electrical lead 32, these being connected to the cathode of the uppermost cell and the anode of the lowermost cell, respectively. The mixing of air and fuel at the top and bottom of the stack is prevented by air tube manifold end plates 8 which deliver and exhaust air from the stack via tubes 7 while maintaining separation between the air and fuel streams at the top and bottom of the stack. Further voltage increases can be achieved by the appropriate interconnection of adjacent fuel cell stacks within an enclosure for the delivery of fuel and oxidants in conventional fashion.

Figure 5A:
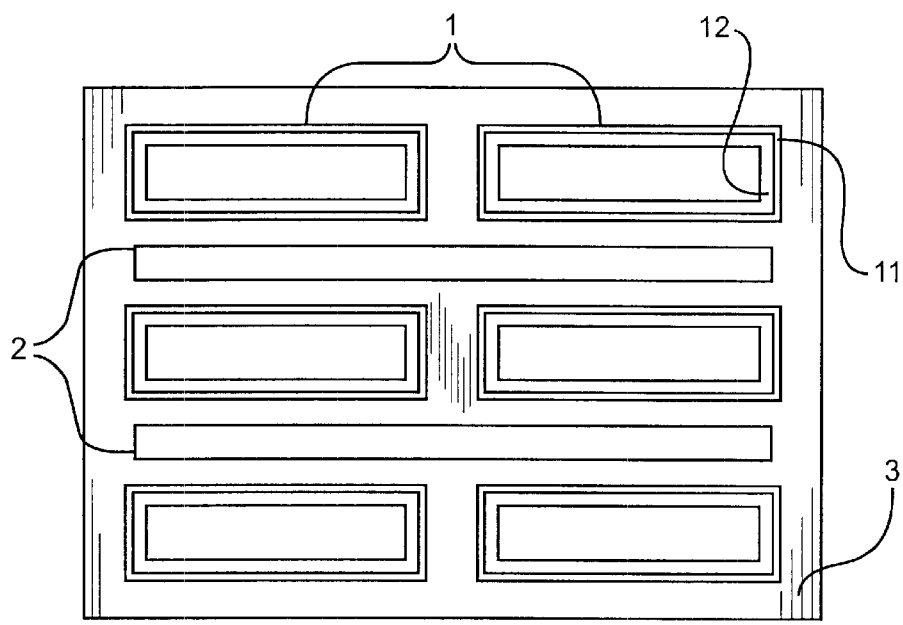
FIGS. 5a–5b schematically illustrate alternative cell designs for honeycomb electrodes provided in accordance with the invention.
Figure 5B:
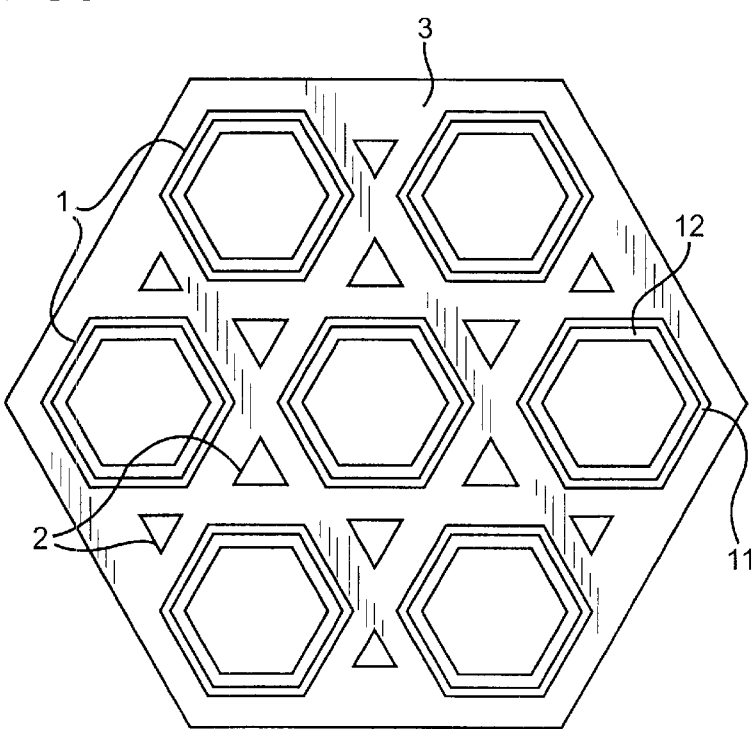

In the contemplated design, efficient fuel cell operation does not necessarily require shape, size or surface area equivalence between the oxidant and fuel channels provided in the cell. FIGS. 5*a* and 5*b* of the drawing illustrate two alternative honeycomb designs wherein the air or oxidant channels 1 differ in size and shape from the fuel channels 2. Thus honeycomb channel structures used in accordance with the invention will be designed to balance process cost, thermal shock tolerance, manifolding ease, and active area as required for each particular fuel cell application.

In FIG. 5*a*, the honeycomb electrode structure is provided with fuel and air channels separated into alternate rows. This structure may be conveniently manifolded in a manner similar to the honeycomb heat exchangers described, for example, in U.S. Pat. No. 4,271,110. The active area of the cell is increased through the use of the larger air channels which contain the electrolyte and cathode layers.

FIG. 5*b* shows a honeycomb composed of hexagonal and triangular channels wherein each hexagonal air or oxidant channel 1 is surrounded by six triangular fuel channels 2. The triangular channels are shared by three hexagons, yielding a triangle:hexagon ratio of 2:1. In this case, the wall area of both types of channels is equal. However the open area of the hexagonal channel is several times greater than the triangular channels, providing better access for various electrolyte and cathode coating processes.

Other potential advantages of this geometry over a simple checkerboard geometry include greater tolerance in air feed tube insertion, so that the misfeeding of large air tubes into small fuel channels cannot occur. Also, the segregation of coating materials in channel corners is less problematic with hexagonal channels than with square channels. Finally, depending on the channel dimensions, advantage can be taken of the different channel sizes to facilitate selective coating. Thus with coating or masking materials of appropriate rheology, differences in channel wall penetration and wetting behavior arising from differences in channel geometry can effect the selective penetration and coating of only one class of channels in a honeycomb partially immersed in such a material, e.g., by capillary action, leaving other classes of channels completely open.

All of the considerations arising in the construction and use of fuel cells based on honeycomb-structured anodes apply with equal advantage and effect to the construction of fuel cells wherein mechanical support is provided by a honeycomb composed of cathodic material. The same oxide mixtures or compounds used to provide cathode coatings in the channels of honeycomb anodes can be extruded or otherwise formed and sintered to provide strong, highly oxidation resistant honeycomb cathodes. Thin electrolyte and anode coatings can then be applied to the channels of the honeycombs to provide effective and dependable electrical performance without any need for additional structural support from the electrolytes or anode materials employed.

We claim:

1. A solid oxide fuel cell element comprising:

an integral porous conductive metallic anode of honeycomb shape incorporating interconnecting channel walls forming parallel channels extending from a first face to a second face of the honeycomb shape;

plural electrolyte layers disposed on the walls of a plurality of the parallel channels; and plural cathode layers disposed the electrolyte layers, each channel in the plurality of channels sharing at least one channel wall with a channel not provided with electrolyte and cathode layers.

2. A solid oxide fuel cell element in accordance with claim 1 wherein the metallic anode is composed of porous nickel, nickel alloy, or nickel cermet.

3. A solid oxide fuel cell element in accordance with claim 1 wherein the anode is a honeycomb shape comprising a combination of channels of hexagonal cross-section sharing channel walls with channels of triangular cross-section.

4. A solid oxide fuel cell element in accordance with claim 1 wherein the electrolyte layers are composed predominantly of zirconia.

5. A solid oxide fuel cell element in accordance with claim 1 wherein the cathode layers are composed of a cathodic material selected from the group consisting of lanthanum strontium manganite, lanthanum strontium chromite, and silver alloy.

6. A method for making a solid oxide fuel cell element comprising the steps of:

providing an integral anode of honeycomb shape composed of porous conductive metal and incorporating interconnecting channel walls forming parallel channels extending from a first face to a second face of the honeycomb shape;

providing electrolyte layers on the walls of selected channels, each selected channel sharing at least one channel wall with a channel not provided with an electrolyte layer; and providing counter-electrode layers on the electrolyte layers.

7. A method for making a solid oxide fuel cell element in accordance with claim 6 wherein the electrolyte or counter-electrode layers are provided by selective liquid coating.

8. A method for making a solid oxide fuel cell element in accordance with claim 7 wherein selective liquid coating is promoted by capillary action.

* * * * *